US009459832B2

(12) United States Patent
Guccione

(10) Patent No.: US 9,459,832 B2
(45) Date of Patent: Oct. 4, 2016

(54) PIPELINED MULTIPLY-SCAN CIRCUIT

(71) Applicant: Bank of America Corporation, Charlotte, NC (US)

(72) Inventor: Steven A. Guccione, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 14/303,225

(22) Filed: Jun. 12, 2014

(65) Prior Publication Data

US 2015/0363168 A1    Dec. 17, 2015

(51) Int. Cl.
*G06F 7/523* (2006.01)
*G06F 7/53* (2006.01)

(52) U.S. Cl.
CPC .............. *G06F 7/523* (2013.01); *G06F 7/5306* (2013.01)

(58) Field of Classification Search
None
See application file for complete search history.

(56) References Cited

U.S. PATENT DOCUMENTS

| | | | |
|---|---|---|---|
| 3,582,634 A | 6/1971 | Bartlett | |
| 3,670,956 A | 6/1972 | Calhoun | |
| 3,752,971 A | 8/1973 | Calhoun et al. | |
| 3,761,699 A | 9/1973 | Sather | |
| 3,777,131 A | 12/1973 | Llewellyn | |
| 3,794,820 A | 2/1974 | Robinson | |
| 3,805,043 A | 4/1974 | Clary | |
| 3,885,141 A | 5/1975 | Kieburtz | |
| 3,890,837 A | 6/1975 | Frizzell et al. | |
| 3,906,199 A | 9/1975 | Kieburtz et al. | |
| 3,956,622 A | 5/1976 | Lyon | |
| 4,013,879 A | 3/1977 | Bornmann et al. | |
| 4,215,417 A | 7/1980 | Nishitani | |
| 4,228,520 A | 10/1980 | Letteney et al. | |
| 4,796,219 A | 1/1989 | Williams | |
| 4,799,182 A | 1/1989 | Marwood | |
| 4,860,240 A | 8/1989 | Hartley et al. | |
| 4,994,997 A | 2/1991 | Martin et al. | |
| 5,867,414 A | 2/1999 | Kao | |
| 6,122,751 A | 9/2000 | Janssens et al. | |
| 7,181,484 B2 * | 2/2007 | Stribaek ................ | G06F 7/5443 708/492 |
| 7,356,554 B1 * | 4/2008 | Hazanchuk ........... | G06F 7/5324 326/39 |
| 7,996,741 B2 | 8/2011 | Touba et al. | |
| 8,041,759 B1 * | 10/2011 | Langhammer ....... | H03K 19/177 326/38 |
| 9,002,915 B1 * | 4/2015 | Young ..................... | G06F 5/015 708/209 |
| 2009/0077145 A1 * | 3/2009 | Dobbelaere ........... | G06F 7/5312 708/232 |

OTHER PUBLICATIONS

Wikipedia, "Software Pipelining," retrieved from Wikipedia on Jun. 12, 2014, 6 pages.
Blelloch, Guy E., "Prefix Sums and Their Applications," Chapter1, School of Computer Science Carnegie Mellon University, Nov. 1990, 26 pages.
Wikipedia, "Prefix Sum," retrieved from Wikipedia on Jun. 12, 2014, 5 pages.
Wilt, Nicholas, "Scan," Chapter 13, Cuda Handbook, Jun. 2013, 24 pages.

* cited by examiner

*Primary Examiner* — Michael D Yaary
(74) *Attorney, Agent, or Firm* — Banner & Witcoff, Ltd.; Michael A. Springs

(57) ABSTRACT

A pipelined multiply-scan circuit that may be used for high-performance computing. The pipelined multiply-scan circuit may comprise dedicated hardware configured to execute one or more sub-calculations associated with a pipelined multiply-scan process utilizing one or more serially-connected left-shift modules, and one or more serially-connected adder.

20 Claims, 5 Drawing Sheets

FIG. 4

| | 1 402 | 2 404 | 3 406 | 4 408 | 5 410 | 1 412 | 2 414 | 3 416 | 4 418 |
|---|---|---|---|---|---|---|---|---|---|
| Input | | | | | | | | | |
| Output | 1 420 | 2 422 | 6 424 | 24 426 | 120 428 | 120 430 | 240 432 | 720 434 | 2880 436 |

PIPELINED MULTIPLY-SCAN CIRCUIT

TECHNICAL FIELD

Aspects of this disclosure generally relate to systems and methods for calculating multiply-scan results using direct hardware implementations of circuitry.

BACKGROUND

High-performance computing systems may utilize specialized computer hardware to execute a single or a limited number of processes with improved efficiency (decreased processing time and/or power) over that of a general-purpose computer system executing that same process/processes. For example, execution of a multiplication operation, by a general-purpose processor as part of a general-purpose computer system, may be comparatively less efficient than a pipelined multiplication operation executed by an application-specific integrated circuit (ASIC) (utilizing a special-purpose configuration of transistors/logic gates to make up the multiplication circuit). Similarly, a multiply-scan operation is an example of a comparatively inefficient operation when executed by a general-purpose computer system, and when compared to simpler operations, including, among others, addition operations, or simple logic operations (bitwise AND, OR, NOT, XOR, left shift, right shift, and the like). Currently, however, no special-purpose circuit exists for executing a pipelined multiply-scan operation.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to a pipelined multiply-scan apparatus having a first input channel for receiving a multiply-scan input signal and a second input channel for receiving a zero-value input signal. The apparatus further has two serially-connected left-shift modules, and three serially-connected adder modules configured to receive and process the multiply-scan input signal and the zero-value input signal to give a multiply-scan result value. In particular, a first adder module is configured to pass the zero-value to the second adder module upon receipt of an enable input corresponding to a pass value. Alternatively, the first adder module is configured to add the zero-value and the multiply-scan input signal upon receipt of an enable input corresponding to an add value. Further, second and third adder modules are configured to receive inputs from respective first and second left-shift modules as well as respective outputs from the first and second adder modules. Accordingly, a second adder module is configured to pass an input received from the first adder module upon receipt of an enable input corresponding to pass value, and configured to add a value received from a first left-shift module and a value received from the first adder module upon receipt of an enable input corresponding to an add value. Similarly, a third adder module is configured to pass an input received from a second adder module upon receipt of an enable input corresponding to pass value, and configured to add a value received from a second left-shift module and a value received from the second adder module upon receipt of an enable input corresponding to an add value. Accordingly, an output from the third adder module is a multiply-scan result corresponding to the received multiply-scan input signal.

In another aspect, this disclosure includes a non-transitory computer-readable storage medium comprising computer-executable instructions configured to cause a processor to receive a series of binary input values, pass the binary input values to a series of left-shift modules and a series of adder modules, and calculate pipelined multiply-scan output values, based on the received series of binary input values. Further, the computer-executable instructions are configured to output a result from an adder module corresponding to an addition of inputs received at two interfaces of the adder module, or corresponding to an input received at a second of the interfaces, and based upon an enable input value received from the same adder module from an immediately-preceding clock cycle.

In yet another aspect, this disclosure relates to a computer-implemented method for performing a pipelined multiply-scan, including two serially-connected left-shift modules and three serially-connected adder modules. The method includes a first left-shift module for receiving and left-shifting a binary input value, and a first adder module for receiving and outputting a first adder output value based on the binary input value. Further, the method includes a second left-shift module for receiving and left-shifting a first output value from the first left-shift module, and a second adder module for receiving the first adder output value and a left-shifted output value from the first left-shift module, and outputting a second adder output value. Additionally, the method includes a third adder module for receiving the second adder output value and a left-shifted output value from the second left-shift module, and outputting a third adder output value.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

FIG. 4 schematically depicts a table of multiply-scan results according to one or more aspects described herein.

DETAILED DESCRIPTION

High-performance computing may utilize special-purpose computer hardware, otherwise referred to as dedicated computer hardware, to execute a single or a limited number of processes with greater efficiency (less processing time and/or processing power needed) than that of a general-purpose processor executing the same single or limited number of processes in a general-purpose computer system. For example, a multiply-scan operation may represent a comparatively less efficient operation when performed by a general-purpose processor, and when compared to simpler operations, including, among others, an addition operation, or simple logical operations, including bitwise AND, OR, NOT, XOR, left shift, right shift, and the like.

The systems and methods described herein include a pipelined multiply-scan circuit that may be used for high-performance computing. Accordingly, in one example, a multiply-scan operation may be utilized to update a result value to equal the product of an input value and a previous result value. This multiply-scan operation may be written as follows:

$$C^* = A \quad (1)$$

$$C = C^* A \quad (2)$$

Equations (1) and (2) above comprise equivalent notation for a multiply-scan operation that updates an output value "C" by multiplying an input value "A" by a previous value of "C," and such that the "=" symbol is a simple assignment operator.

Accordingly, in the context of this disclosure, a pipelined multiply-scan circuit may comprise dedicated hardware configured to execute one or more sub-calculations associated with a pipelined multiply-scan process. In one example, a pipelined multiply-scan circuit may utilize an application-specific integrated circuit (ASIC). In another example, a pipelined multiply-scan circuit may utilize a field-programmable gate array (FPGA). Accordingly, in yet another example, a pipelined multiply-scan circuit may utilize a combination of discrete logic block components, or other forms of special-purpose components configured to allow for processing of digital information, and the like. Furthermore, the disclosures described herein may be utilized partially or wholly with analog circuitry. Additionally or alternatively, the systems and methods described herein for implementing a pipelined multiply-scan circuit may utilize general-purpose computer hardware, or a combination of general-purpose computer hardware and dedicated/specialized computer hardware.

Figure 1:
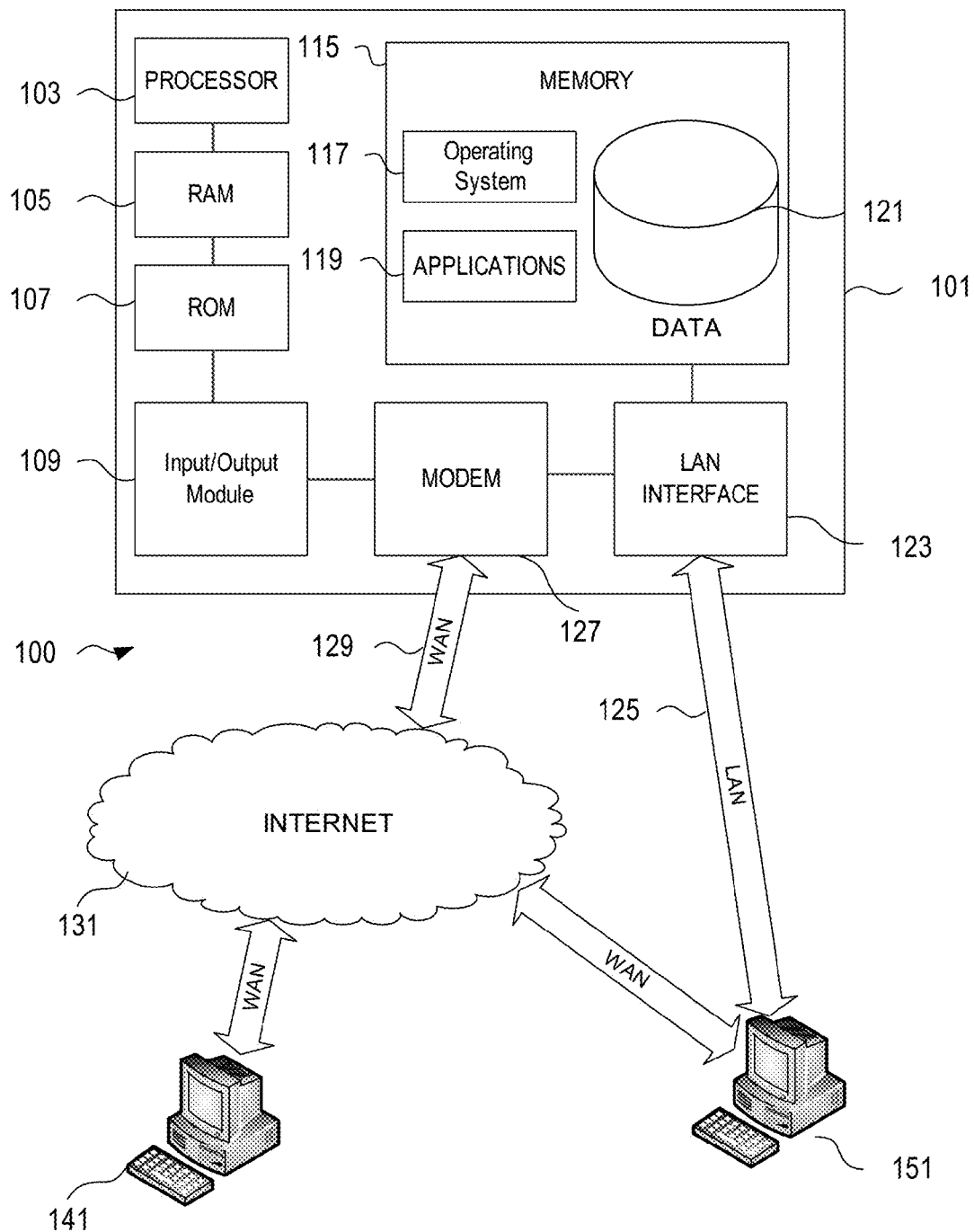
FIG. 1 shows an illustrative operating environment in which various aspects of the disclosure may be implemented.

Accordingly, with reference to FIG. 1, a pipelined multiply-scan circuit may be implemented as a general-purpose or specialized computing system 100. As such, the pipelined multiply-scan circuit may include one or more network-linked computer devices, such as devices 101, 141, and/or 151. Furthermore, the pipelined multiply-scan circuit 100 may be implemented on consolidated computing hardware, such as computing device 101, at a single geographic location, and/or on a single integrated circuit, and the like. In another example, the pipelined multiply-scan circuit 100 may be implemented across multiple computing devices at a common, or dispersed geographic locations. As such, device 100 may comprise computing devices 101, 141, and/or 151 in communication with one another using one or more networking technologies (125, 129, and/or 131) described in further detail in the description that follows.

In one example implementation, computing device 101 may have a processor 103 for controlling overall operation of device 101 and its associated components, including RAM 105, ROM 107, an input/output (I/O) module 109, and memory 115. In one example, as will be apparent to those of ordinary skill in the art, memory 115 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 115 may comprise a non-transitory computer-readable medium that may communicate instructions to processor 103 to be executed.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for allowing the computing device 101 to perform various functions. For example, memory 115 may store software used by the computing device 101, such as an operating system 117, application programs 119, and an associated database 121. The processor 103 and its associated components may allow the computing device 101 to run a series of computer-readable instructions to process and format data.

The computing device 101 may operate in a networked environment supporting connections to one or more remote computers, such as computing devices 141 and 151. In one example, the computing devices 141 and 151 may be personal computers or servers that include many, or all, of the elements described above relative to the computing device 101. Alternatively, computing device 141 and/or 151 may be a data store that is affected by the operation of the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed. Accordingly, communication between one or more of computing devices 101, 141, and/or 151 may be wired or wireless, and may utilize Wi-Fi, a cellular network, Bluetooth, infrared communication, or an Ethernet cable, among many others.

Additionally, an application program 119, used by the computing device 101 according to an illustrative embodiment of the disclosure, may include computer-executable instructions for invoking functionality related to a pipelined multiply-scan circuit.

The computing device 101 and/or the other devices 141 or 151 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
FIGS. 2A and 2B depict exemplary multiply-scan result tables according to one or more aspects described herein.

FIG. 2A depicts a table 200 comprising a series of input values 204-210 and a related series of output values 212-218 associated with a pipelined multiply-scan circuit. In one example, table 200 illustrates exemplary input values 204-210 and output values 212-218 corresponding to those equations (1) and (2) described above. For instance, output value 214 is a product of input value 206 and the previous output value 212, output value 216 is a product of input value 208 and the previous output value 214, and so forth.

Similarly to FIG. 2A, FIG. 2B depicts a table 202, comprising a series of input values 220-226 and a related series of output values 228-234 associated with a pipelined multiply-scan circuit. In particular, table 202 comprises a series of input values 220-226, and a series of output values 228-234, corresponding to those input values 204-210 and output values 212-218 from table 200, but represented as binary numbers.

Figure 3:
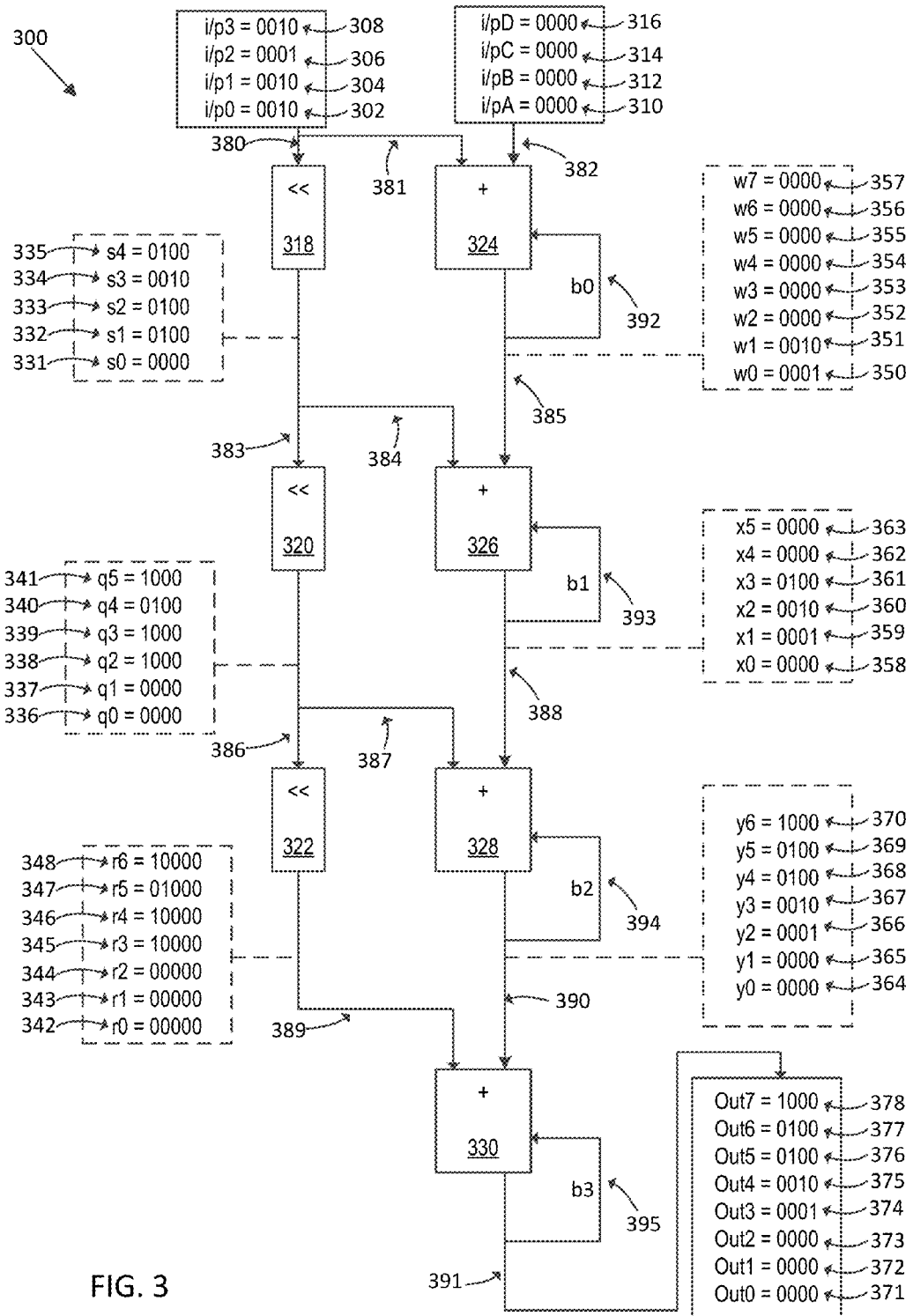
FIG. 3 schematically depicts a pipelined multiply-scan circuit according to one or more aspects described herein.

FIG. 3 schematically depicts a pipelined multiply-scan circuit 300. In particular, the pipelined multiply-scan circuit 300 is schematically depicted as having a series of binary input values 302-308, wherein binary input value 302 represents a first input value, binary input value 304 represents a second input value, and so forth. As such, the pipelined multiply-scan circuit 300 is described in relation to binary numbers, but those of ordinary skill in the art will understand that the various descriptions of the pipelined multiply-scan circuit 300 may be utilized with additional or alternative numbering formats and/or encoding formats including, among others, decimal numbering or hexadecimal numbering, and utilizing different number types including, among others, integers, signed integers, and/or floating-point numbers, or combinations thereof. Further, in one example, input values 302-308 may comprise encoded numerical values encoded as one or more voltage levels, current levels, light frequencies, light amplitude and/or frequency modulations, and the like.

Those of ordinary skill in the art will recognize that input values 302-308 represent an exemplary series of inputs, and fewer or more inputs than those depicted inputs 302-308 may be used with circuit 300.

The pipelined multiply-scan circuit 300 further includes a series of null-value/zero-value inputs 310-316. Accordingly, the number of null-value inputs 310-316 may be equal to the number of inputs 302-308. Alternatively, a single null-value input may be repeated for each of the input values 302-308.

It will be readily apparent to those of ordinary skill that input values 302-308 and/or inputs 310-316 may be stored in a form of persistent or volatile memory such as, among others, a register circuit (shift register), a RAM, a ROM, a hard disk drive, a solid state drive, a magnetic tape, optical disk, flash memory, or combinations thereof.

In one example, elements 318, 320, and 322 represent left-shift modules. In one implementation, a left-shift module (such as one or more of module 318, 320, and/or 322) is configured to process an input value, and output a result value corresponding to the input value after processing the input value using a bitwise logical left shift operation. Accordingly, those of ordinary skill in the art will readily understand one or more processes for left shifting a binary number. For example, binary number 0100 (corresponding to a decimal number 4), when left-shifted, results in a binary number 1000 (corresponding to a decimal number 8), and the like. As such, left-shift module 318 receives one or more input values at a link 380, and outputs left shifted result values at a link 383. Similarly, left-shift module 320 receives one or more input values from the link 383, and outputs left shifted result values to link 386. Additionally, left-shift module 322 receives one or more input values from link 386, and outputs left shifted result values to link 389.

Those of ordinary skill in the art will recognize that one or more of left shift modules 318-322 may be implemented using dedicated hardware components. For example, a left shift module, such as left shift module 318, 320, and/or 322, may be implemented as one or more logic gates constructed using a plurality of transistor elements, and the like. In one specific example, a left shift module, such as left shift module 318, 320, and/or 322, may be implemented as a register circuit (shift register), and the like. Those of ordinary skill in the art, however, will recognize various additional or alternative implementations of a left shift module 318, 320, and/or 322, without departing from the disclosures described herein. In another example, one or more of left shift modules 318, 320, and/or 322 may be implemented using general-purpose computer hardware, such as a general-purpose processor, and the like. Additionally, one or more of left shift modules 318, 320, and/or 322 may be implemented using a combination of dedicated and general-purpose computer hardware.

In one implementation, one or more of left-shift modules 318, 320 and/or 322 may be initialized with output values equal to zero (in the specific example depicted in FIG. 3 utilizing 4-bit example numbers, left-shift modules 318, 320, and/or 322 may be initialized with output values equal to binary number zero, depicted as "0000").

In one example, links 380, 383, 386, and/or 389 may comprise communication channels between the depicted elements of the pipelined multiply-scan circuit 300. Accordingly, links 380, 383, 386, and/or 389 may comprise physical hardware links, such as, among others, one or more of a wire, a cable, a data bus, an integrated circuit pin, a wireless communication channel, or a fiber optic channel, or combinations thereof. Additionally or alternatively, links 380, 383, 386, and/or 389 may comprise software processes configured to communicate information between two or more elements from pipelined multiply-scan circuit 300. In this way, links 380, 383, 386, and/or 389 may comprise any known software process for communicating information between hardware and/or software elements. Furthermore, links 380, 383, 386, and/or 389 may comprise a combination of hardware, software, and/or firmware, and the like. Accordingly, one or more links 380, 383, 386, and/or 389 may be referred to as interfaces (input interfaces or output interfaces), or communication channels, and the like.

In one implementation, one or more left shift modules 318, 320, and/or 322 may process an input value to produce a left shifted output value at each clock cycle of the pipelined multiply-scan circuit 300. Accordingly, those of ordinary skill in the art will recognize various implementations of clocking a digital circuit, such as circuit 300. For example, a clock module (otherwise referred to as a timer module), which may, in one implementation, be dedicated or a general-purpose circuit element, such as processor 103, may be utilized to provide a common, or synchronized, clock signal to multiple circuit elements, such as left-shift modules 318, 320, and/or 322. Accordingly, a clock signal may comprise, among others, one or more of a voltage signal or a current signal, and which may be implemented as a periodically changing (oscillating) numerical value. As such, one or more of left shift modules 318, 320, and/or 322 may be clocked at a rising edge, a falling edge, a high level, or a low level of a received clock signal, among others. In this way, one or more of left shift modules 318, 320, and/or 322 may process input values received from links 380, 383, and/or 386, respectively, in a serial manner, and receive an input value at each clock cycle, or multiple of clock cycles, and the like. Further, those of ordinary skill in the art will recognize various clock technologies that may be utilized to synchronize/clock the depicted pipelined multiply-scan circuit 300. For example, a clock module (not pictured) may comprise a hardware circuit having an oscillator (such as a crystal oscillator) from which a clock signal is produced. In another example, a clock module (not pictured) may provide a clock signal based on a clock speed of a processor chip/circuit. In yet another example, a clock module (not pictured) may provide a clock signal based on a timer circuit and/or a software timer, among others.

In one implementation, those schematically-depicted values 331-335 represent intermediate values, outputted from left-shift module 318, and serially-inputted into left-shift module 320 from link 383. Specifically, value 331 is an initialized output value from left-shift module 318 (an initialized zero value). Further, values 332-335 are left-shifted output values corresponding to input values 302-308, respectively. Further, schematically-depicted values 336-341 represent intermediate values, outputted from left-shift module 320, and serially-inputted into left-shift module 322 from link 386. Specifically, value 336 corresponds to an initialized output value from left-shift module 318 (an initialized zero value). Further, schematically-depicted values 337-341 are left-shifted output values corresponding to input values 331-335. Additionally, schematically-depicted values 342-348 represent values outputted from left-shift module 322, and serially-inputted into adder module 330 from link 389. Specifically, value 342 is an initialized output value from left-shift module 322 (an initialized zero value). Further, values 343-348 are left-shifted output values corresponding to input values 336-341, respectively.

In one implementation, the pipelined multiply-scan circuit 300 comprises adder modules 324-330. Accordingly, an adder module, from those adder modules 324-330, may be configured to add two binary numbers, or to pass a single binary number, based on an enable input value. In one example, adder modules 324-330 may be implemented directly in hardware (dedicated or general-purpose computer hardware). In another example, one or more adder modules 324-330 may be implemented in software. In yet another example, one or more adder modules 324-330 may be implemented with a combination of dedicated hardware, general-purpose hardware, firmware, and/or software, and the like.

In one example, adder module 324 receives the series of input values 302-308 at interface 381 (otherwise referred to as link 381, and the like), and the series of input values 310-316 at interface 382. Accordingly, in one example, adder module 324 may be configured to add a first input value received at interface 381 to a second input value received at interface 382 if an enable value received at interface 392 corresponds to an add value. Further, the adder module 324 may be configured to pass an input value received at interface 382 if the enable value received at interface 392 corresponds to a pass value. Accordingly, adder module 324 may output the result of an addition of an input received at interface 381 with a value received at interface 382, or alternatively output a value received at interface 382 (pass value) to interface 385. In one implementation, the enable value received by adder module 324 at interface 392 corresponds to an output value outputted from adder module 324 to interface 385. Specifically, the enable value communicated through that feedback loop represented by interface 392 is generated based on an output value from adder module 324 from and immediately-preceding clock cycle of pipelined multiply-scan circuit 300.

Accordingly, the enable input received at interface 392 may determine whether adder module 324 adds a first input received at interface 381 to a second input received at interface 382, or passes an input received at input 382, based on an output value from adder module 324 from an immediately-preceding clock cycle of adder module 324. In one example, interface 392 (which comprises a feedback loop from adder module 324) communicates an enable value to adder module 324 corresponding to a least significant bit (LSB) from the output of adder module 324 from an immediately-preceding clock cycle. Accordingly, in one example, adder module 324 may be configured to add a first value received at interface 381 to a second value received at interface 382 if the least significant bit (LSB) from an immediately-preceding output value from adder module 324 has a binary value of one (enable value corresponds to an add value when LSB is equal to 1, or logic high level), and to pass the second value received at interface 382 if the value of the least significant bit from an immediately-preceding output value from adder module 324 has a binary value of zero (enable value corresponds to a pass value when LSB is equal to 0, logic level low). Those of ordinary skill in the art will recognize, however, that an enable value received at interface 392 may alternatively comprise an add value corresponding to a LSB value of 0 (logic level low), and a pass value corresponding to a LSB value of 1 (logic level high), or any other enable signal values.

In one example, adder modules 326-330 may be similar to adder module 324. Accordingly, in one implementation, the functionality of adder module 324 may be implemented using dedicated hardware components comprising logic blocks constructed from a plurality of transistors, and the like. In another implementation, adder module 324 may be implemented using application-specific integrated circuits, a field-programmable gate array, or any other dedicated hardware components known to those of ordinary skill in the art. Indeed, it will be readily apparent to those of ordinary skill in the art that various adder circuit designs may be utilized to implement one or more of adders 324-330 without departing from the scope of the disclosures described herein. In the exemplary embodiment of FIG. 3, adders 324-330 may comprise 4-bit adders, however those of ordinary skill in the art will recognize that adders 324-330 may be implemented as N-bit adders, where N is any integer value, and the like.

In one example, adder module 326 may receive an output from left-shift module 318 at interface 384, and an output from adder module 324 at interface 385. Accordingly, adder module 326 may add the input received at interface 384 to the input received at interface 385 based upon an enable input received at interface 393 corresponding to an output from adder module 326 from an immediately-preceding clock cycle. Similarly, adder module 328 may receive an output from the left-shift module 320 at an interface 387, and an output from adder module 326 at an interface 388. Accordingly, adder module 328 may add the input received at interface 387 to the input received as interface 388 based upon an enable input received at interface 394 corresponding to an output from adder module 328 from an immediately-preceding clock cycle. Further, adder module 330 may receive output from left-shift module 322 at interface 389, and an output from adder module 328 at interface 390. Accordingly, adder module 330 may add the input received at interface 389 to the input received at interface 390 based upon an enable input received at interface 395 corresponding to an output from adder module 330 from an immediately-preceding clock cycle.

In one implementation, an enable value received on interface 393, by adder module 326, may correspond to a bit-1 number of an immediately-preceding output from adder module 326. Similarly, an enable value received on interface 394, by adder module 328, may correspond to a bit-2 number of an immediately-preceding output from adder module 328. Further, an enable value received on interface 395, by adder module 330, may correspond to a bit-3 number of an immediately-preceding output value from outer module 330.

Those of ordinary skill in the art will recognize that links 381, 382, 384, 385, 387, 388, 389, 390, 391 and 392-395 may be similar to links 380, 383, 386, and/or 389, and may comprise physical hardware links. As such, links 381, 382, 384, 385, 387, 388, 389, 390, 391 and 392-395, may comprise one or more of a wire, a cable, a data bus, an integrated circuit pin, a wireless communication channel, or a fiber optic channel, or combinations thereof. Additionally or alternatively, these links may comprise software processes configured to communicate information between two or more elements from pipelined multiply-scan circuit 300. In this way, these links may comprise any known software process for communicating information between hardware and/or software elements. Furthermore, links 381, 382, 384, 385, 387, 388, 389, 390, 391 and 392-395 may comprise a combination of hardware, software, and/or firmware, and the like. Accordingly, one or more links 381, 382, 384, 385, 387, 388, 389, 390, 391 and 392-395 may be referred to as interfaces (input interfaces or output interfaces), or communication channels, and the like In one implementation, adder modules 324-330 may selectively perform an addition process or a pass process for each clock cycle of the circuit 300. In this way, numerical values, such as values 350-357, 358-363, 364-370, and 371-378 may be propagated between adder modules 324-330 in a serial manner upon each clock cycle of the circuit 300.

In one example, adder module 324 may be initialized with an initial output value of 1 (initialized output value equal to binary number 0001, and the like). Further, adder modules 326-330 may be initialized with output values of 0 (initialized output values equal to binary number 0000, and the like). In one implementation, values 350-357 schematically depict intermediate values outputted from adder module 324 to interface 385. Accordingly, value 350 corresponds to the initialized output value of 0001 from adder module 324.

As previously described, adder module 324 may be configured to add the values received at interfaces 381 and 382 if an enable value received at interface 392 corresponds to a LSB output value of 1 from an immediately-preceding output from adder module 324. Additionally or alternatively, adder module 324 is configured to pass a value received at interface 382 if an enable value received an interface 392 corresponds to a LSB output value of 0. Accordingly, value 351 corresponds to an addition of input values 302 and 310 due to a LSB value of 1 for an immediately-preceding output value 350 from adder module 324. Further, value 352 corresponds to passing of value 312 due to a LSB value of 0 for an immediately-preceding value 351. Value 353 corresponds to passing of value 314 due to a LSB value of 0 for the immediately-preceding value of 352, and so forth.

Adder module 326 may be configured to add the values received at interfaces 384 and 385 if an enable value received at interface 393 corresponds to a bit-1 output value of one from an immediately-preceding output from adder module 326. Additionally, adder module 326 is configured to pass a value received at interface 385 if an enable value received on interface 393 corresponds to a bit-1 value of zero. In one implementation, values 358-363 schematically depict intermediate values outputted from adder module 326 to interface 388. Accordingly, value 358 schematically depicts an initialized output value of 0000 from adder 326. Value 359 corresponds to a passing of value 350 due to a bit-1 value of 0 for the immediately-preceding value of 358. Similarly, value 360 corresponds to a passing of value 351 due to a bit-1 value of 0 for the immediately-preceding value 359. Value 361 corresponds to an addition of value 333 with 352 due to a bit-1 value of 1 for the immediately-preceding value 360, and so forth.

In one example, adder module 328 may be configured to add the values received at interfaces 387 and 388 if an enable value received at interface 394 corresponds to a bit-2 value of 1. Additionally, adder module 328 is configured to pass a value received at interface 388 if an enable value received at interface 394 corresponds to a bit-2 value of 0. In one implementation, values 364-370 schematically depict intermediate values outputted from adder module 328 to interface 390. Accordingly, value 364 schematically depicts an initialized output value of 0000 from adder 328. Further, value 365 corresponds to a pass of value 358 due to a bit-2 value of 0 for the immediately-preceding value 364, and so forth.

Further, adder module 330 may be configured to add the values received at interfaces 389 and 390 if an enable value received at interface 395 corresponds to a bit-3 value of 1 for an immediately-preceding output value from adder 330. Additionally, adder module 330 is configured to pass a value received at interface 390 if an enable value received at interface 395 corresponds to a bit-3 value of 0 for an immediately-preceding output value from adder 330. Accordingly, values 371-378 correspond to multiply-scan output values from circuit 300. In particular, output 371 corresponds to an initialized output value of 0000 from adder 330. Further, output 372 corresponds to a passing of value 364 due to a bit-3 value of 0 for the immediately-preceding value 371, and so forth.

Consulting table 202 from FIG. 2B, it is apparent that outputs 375-378 from circuit 300 correspond to multiply-scan outputs for those inputs 302-308. Accordingly, outputs 371-374 represent multi-scan outputs corresponding to those initialized output values from the left shift modules 318-322, and adder modules 324-330. Accordingly, for those four adder modules 324-330, multiply-scan circuit 300 has a propagation latency value of four, and a delay value of one. For example, the multiply-scan circuit 300 may produce a multiply-scan output result (such as results 371-378) for each clock cycle of the circuit 300 (this may be described as a delay value of 1). However, for this same multiply-scan circuit 300, an output value (such as output value 374) corresponding to an input value (such as input value 302) may arrive with a latency value of 4, and due to the time it takes (in one example, four clock cycles) for the input value 302 to propagate through the four intermediate adder modules 324-330 of multiply-scan circuit 300.

In one example, outputs values 371-378 may be passed to a form of persistent, or volatile memory such as, among others, a memory register circuit, a RAM, a ROM, a hard disk drive, a solid state drive, an optical disk, a flash memory, or combinations thereof.

Those of ordinary skill in the art will recognize that multiply-scan circuit 300 may be adapted for use with larger or smaller binary numbers than those exemplary 4-bit binary numbers described in relation to FIG. 3. In one example, a multiply-scan circuit, similar to that multiply-scan circuit 300 from FIG. 3, comprises a number of adder modules, such as adder modules 324-330, greater than or equal to a number of bits that make up the largest output from the multiply-scan circuit. Accordingly, a multiply-scan circuit, such as the multiply-scan circuit 300 from FIG. 3, may be generalized to having N adder modules, where N is any integer. In this way, a generalized multiply-scan circuit having N adder modules will have a delay value equal to 1, and a latency value of N.

Accordingly, in one example, a generalized pipelined multiply-scan circuit will have an initial adder module having functionality corresponding to that described in relation to adder module 324, a final adder module having functionality corresponding to adder module 330, and one or more intermediate adder modules corresponding to the functionality described in relation to adder module 326 and 328. Additionally, a generalized pipelined multiply-scan circuit having N adder modules, such as adder modules 324-330, may utilize N−1 left-shift modules, such as left-shift modules 318-322. Accordingly, for a generalized adder circuit comprising N adder modules (where N is any positive integer), the $M^{th}$ adder module (where M is any integer between 0 and N, and adder numbering starts at 0) will have an enable input value corresponding to the $M^{th}$ bit of an output value for that same $M^{th}$ adder module from an immediately-preceding clock cycle.

Accordingly, the term "pipelining," in the context of this disclosure, describes a circuit configured to output a result of a multiply-scan calculation after every cycle of the circuit (every clock cycle associated with a clock module clocking/synchronizing various hardware elements that make up a circuit, such as circuit 300, and the like). In one implementation, after each cycle (clock cycle), an intermediate result of one or more sub-calculations (from adder modules 324-330, and the like) is propagated to a down-stream module that makes up the circuit. Accordingly, for a circuit generalized as having N adder modules (intermediate stages), such as adder modules 324-330, propagation of intermediate values through the N adder modules results in an outputted value being associated with an input value inputted into the pipelined circuit N cycles previously. In this way, a pipelined circuit, as described, has a "delay" of 1, symbolizing the fact that a result of a multiply-scan operation is outputted after every cycle, and has a latency of "N," symbolizing the association between a given result output and a given input value from N cycles previously.

FIG. 4 schematically depicts a table 400 comprising a series of input values 402-418 and output values 420-436 corresponding to a multiply-scan circuit. As such, output 436 represents a highest value of an output that a multiply-scan circuit, similar to multiply-scan circuit 300 from FIG. 3, must be capable of processing. In particular, output 436 corresponds to a decimal value 2880, which is represented as a binary number "101101000000." As such, a multiply-scan circuit, similar to multiply-scan circuit 300 from FIG. 3, which is to process those input values 402-418 from table 400, may comprise at least 12 adder modules (similar to adder modules 324-330) corresponding to those 12-bits in the binary number "101101000000."

Figure 5:
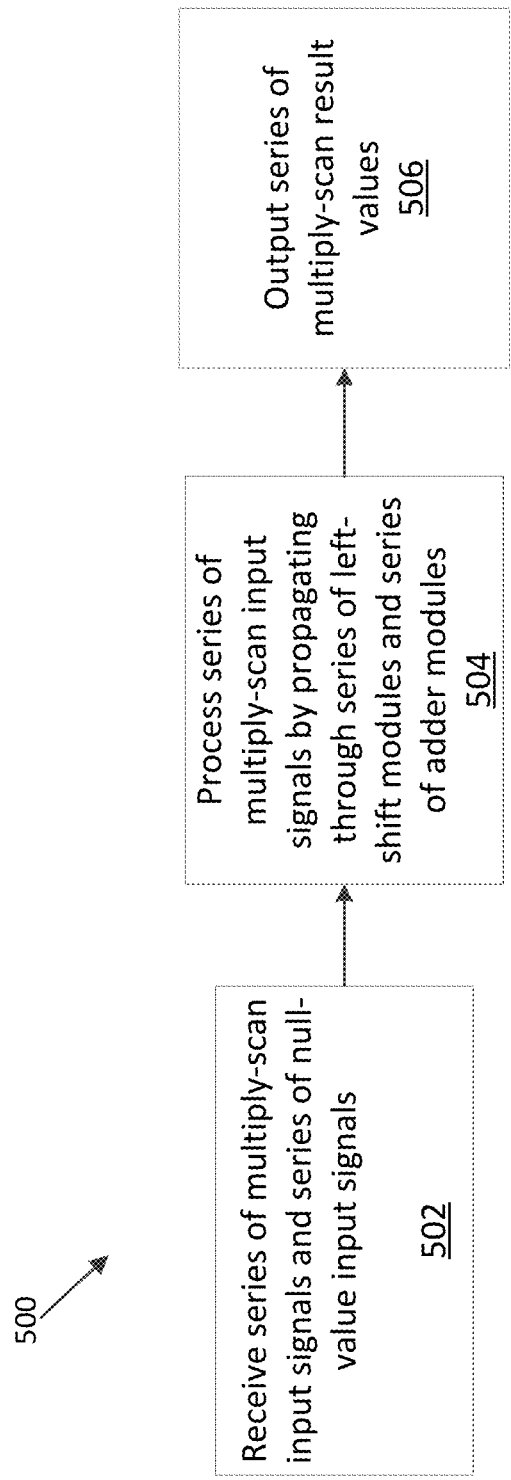
FIG. 5 is a flowchart diagram of a multiply-scan calculation process according to one or more aspects described herein.

FIG. 5 is a flowchart diagram of a process for calculating a series of multiply-scan output values using a direct hardware implementation of a multiply-scan circuit. In one example, block 502 represents one or more processes executed by a pipelined multiply-scan input circuit, such as that circuit 300 from FIG. 3, to receive a series (otherwise referred to as a vector) of multiply-scan input signals (otherwise referred to as input numerical values, such as binary number values, and the like). Accordingly, in one example, at block 502, a series of multiply-scan input signals may be received at a first input channel (otherwise referred to as an input interface, link, or wire, and the like), such as link 380 from FIG. 3, and a series of zero/null-value input signals may be received at a second input channel, such as link 382 from FIG. 3.

In one implementation, block 504 represents one or more processes executed to propagate the series of multiply-scan input signals through a first plurality of serially-connected left-shift modules (such as left-shift modules 318-322). As such, this first plurality of serially-connected left-shift modules may further comprise an initial left-shift module, configured to receive inputs from the first input channel, and a second plurality of serially-connected left-shift modules, comprising a sub-set of the first plurality of left-shift modules, and connected between the initial left-shift module and a final left-shift module.

Additionally, block 504 represents one or more processes executed to propagate the series of multiply-scan input signals through a first plurality of serially-connected adder modules (such as other modules 324-330). As such, the first plurality of serially-connected adder modules may each have a first input interface and a second input interface. Additionally, the first plurality of serially-connected adder modules may further comprise an initial adder module, configured to receive inputs from the first input channel at a first input interface, and configured to receive inputs from the second input channel at a second input interface. Further, the first plurality of serially-connected adder modules may have a second plurality of serially-connected adder modules, comprising a sub-set of the first plurality of adder modules, and connected in series between the initial adder module and a final adder module.

Accordingly, in one implementation, a selected left-shift module, from a group comprising the second plurality of serially-connected left-shift modules and the final left-shift module, may be configured to receive a first left-shift intermediate value corresponding to an output from an immediately-preceding left-shift module, selected from the first plurality of left-shift modules.

Furthermore, a selected adder module, selected from the second plurality of adder modules and the final adder module, may be configured to receive, at a first input interface, a first intermediate input value corresponding to an output value from an immediately-preceding left-shift module, selected from the first plurality of left-shift modules. Additionally, the selected adder module may be configured to receive, at a second input interface, a second intermediate input value corresponding to an output value from an immediately-preceding adder module, selected from the first plurality of adder modules.

In one implementation, each of the first plurality of adder modules may be configured with an enable input interface configured to receive an input signal corresponding to an output value from a same adder module during an immediately-preceding clock cycle.

In yet another implementation, a selected adder module, from the first plurality of adder modules, may be configured to propagate the signal received at the second input interface when the enable input interface receives a propagate signal, and may be configured to add the signals received at the first and the second input interfaces when the enable input interface receives an add signal.

In one example, and at block 506, process 500 is configured to output a series of pipelined multiply-scan results corresponding to the series of multiply-scan input signals received at block 502.

The present disclosures provide technical advantages. As noted above, a pipelined multiply-scan circuit, such as circuit 300, may be utilized to implement a pipelined multiply-scan process partially or wholly using dedicated hardware. As such, the systems and methods described herein provide for comparatively more efficient (in terms of processing power/number of sub-calculations needed) multiply-scan processing than using general-purpose computer hardware, and the like.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that the invention is not to be limited to the embodiments disclosed herein, but is to be understood from the following claims, which are to be interpreted as broadly as allowed under the law.

What is claimed is:

1. A pipelined multiply-scan apparatus comprising:
a first input channel, configured to receive a multiply-scan input signal;
a second input channel, configured to receive a null-value input signal;
a first left-shift hardware module configured to: receive the multiply-scan input signal at a first left-shift input interface, left-shift the multiply-scan input signal, and output a first left-shift output value at a first left-shift output interface;
a first adder hardware module configured to: receive the multiply-scan input signal at a first adder input interface, receive the null-value input signal at a second adder input interface, and output a first adder output value at a first adder output interface;
a second left-shift hardware module, configured to: receive the first left-shift output value at a second left-shift input interface, left-shift the first left-shift output value, and output a second left-shift output value at a second left-shift output interface;
a second adder hardware module configured to: receive the first left-shift output value at a third adder input interface, receive the first adder output value at a fourth adder input interface, and output a second adder output value at a second adder output interface; and
a third adder hardware module configured to: receive the second left-shift output value at a fifth adder input interface, receive the second adder output value at a sixth adder input interface, and output a third adder output value at a third adder output interface,
wherein the first adder hardware module is configured to output the first adder output value equal to the value received at the second adder input interface if a first enable input received at the first adder hardware module corresponds to a pass value, and the first adder hardware module is configured to output the first adder output value equal to a sum of the values received at the first and second adder inputs if the first enable input received at the first adder hardware module corresponds to an add value, and wherein the first enable input is based on a first preceding output value at the first adder output interface from an immediately preceding cycle,
wherein the second adder hardware module is configured to output the second adder output value equal to the value received at the fourth adder input interface if a second enable input received at the second adder hardware module corresponds to a pass value, and the second adder hardware module is configured to output the second adder output value equal to a sum of the values received at the third and fourth adder inputs if the enable input received at the second adder hardware module corresponds to an add value, and wherein the second enable input is based on a second preceding output value at the second adder output interface from an immediately preceding cycle, and
wherein the third adder hardware module is configured to output the third adder output value equal to the value received at the sixth adder input interface if a third enable input received at the third adder hardware module corresponds to a pass value, and the third adder hardware module is configured to output the third adder output value equal to a sum of the values received at the fifth and sixth adder inputs if the enable input received at the third adder hardware module corresponds to an add value, and wherein the third enable input is based on a third preceding output value at the third adder output interface from an immediately preceding cycle.

2. The pipelined multiply-scan apparatus of claim 1, wherein the first adder output value is initialized with a value of one.

3. The pipelined multiply-scan apparatus of claim 1, wherein the first enable input is equal to a binary value of a least significant bit of the first preceding output value, the second enable input is equal to a binary value of a bit number one of the second preceding output value, and the third enable input is equal to a binary value of a bit number two of the third preceding output value.

4. The pipelined multiply-scan apparatus of claim 1, wherein the add value is a logic high level and the pass value is a logic low level.

5. The pipelined multiply-scan apparatus of claim 1, wherein the multiply-scan input signal comprises an encoded numerical value.

6. The pipelined multiply-scan apparatus of claim 1, further comprising:
a timer hardware module, configured to cycle the first and second left-shift hardware modules and the first, second and third adder hardware modules.

7. The pipelined multiply-scan apparatus of claim 1, wherein at least one of the first and second left-shift hardware modules and the first, second and third adder hardware modules is implemented on a field-programmable gate array.

8. The pipelined multiply-scan apparatus of claim 1, wherein the multiply-scan input signal is a binary value encoded based a voltage signal.

9. The pipelined multiply-scan apparatus of claim 1, wherein the multiply-scan input signal is a binary value encoded based a current signal.

10. A non-transitory computer-readable storage medium comprising computer-executable instructions configured to cause a processor to perform:
receive a series of binary input values;
communicate an input value, from the series of binary input values, to a series of left-shift hardware modules and a series of adder hardware modules; and
calculate a pipelined multiply-scan output value,
wherein a selected left-shift hardware module, from the series of left-shift hardware modules, is configured to left-shift a value received at a left-shift interface, and configured to output a left-shifted value to an immediately-following left-shift hardware module in the series of left-shift hardware modules,
wherein a selected adder hardware module, from the series of adder hardware modules, is configured to receive a first adder input at a first adder interface and a second adder input at a second adder interface,
wherein the first adder input corresponds to an output from an immediately-preceding left-shift hardware module, from the series of left-shift hardware modules, and the second adder input corresponds to an output from an immediately-preceding adder hardware module, from the series of adder hardware modules,
wherein the selected adder hardware module is configured to output an adder output value, the adder output value corresponding to a summation of the first adder input and the second adder input when an enable input value of the selected adder hardware module is set to an add value, and the adder output value corresponding to the second adder input when the enable input value is set to a pass value, wherein the enable input value is received from an adder output value from the selected adder hardware module from an immediately-preceding adder hardware module clock cycle, wherein an initial adder hardware module in the series of adder hardware modules receives the series of binary input values at a first initial adder input and a series of binary null values at a second initial adder input, wherein the initial adder hardware module communicates an initial adder output value to an immediately-following adder hardware module in the series of adder hardware modules, and wherein the initial adder output value is a summation of the first initial adder input and the second initial adder input when an enable input value of the initial adder hardware module is set to an add value, and the initial adder output value is the second initial adder input when the enable input value is set to a pass value.

11. The non-transitory computer-readable storage medium of claim 10, wherein a binary number from the series of binary input values comprises a number of bits equal to a number of adder hardware modules in the series of adder hardware modules.

12. The non-transitory computer-readable storage medium of claim 10, wherein the series of left-shift hardware modules and the series of adder hardware modules are clocked by a common clock hardware module.

13. The non-transitory computer-readable storage medium of claim 10, wherein the initial adder output value is initialized with a value of one.

14. The non-transitory computer-readable storage medium of claim 10, wherein the series of left-shift hardware modules comprise shift registers.

15. The non-transitory computer-readable storage medium of claim 10, wherein the series of adder hardware modules comprise N-bit adders, and wherein N is an integer equal to a number of adder hardware modules in the series of adder hardware modules.

16. A computer-implemented method for performing a pipelined multiply-scan, comprising:
  receiving, by a first left-shift hardware module, a binary input value at a first left-shift input interface;
  left-shifting, by the first left-shift hardware module, the binary input value to produce a first left-shift output value at a first left-shift output interface;
  receiving, by a first adder hardware module, the binary input value at a first adder input interface;
  receiving, by the first adder hardware module, a zero value at a second adder input interface;
  outputting, by the first adder hardware module, a first adder output value at a first adder output interface;
  receiving, by a second left-shift hardware module, the first left-shift output value at a second left-shift input interface;
  left-shifting, by the second left-shift hardware module, the first left-shift output value;
  outputting, by the second left-shift hardware module, a second left-shift output value at a second left-shift output interface;
  receiving, by a second adder hardware module, the first left-shift output value at a third adder input interface;
  receiving, by the second adder hardware module, the first adder output value at a fourth adder input interface;
  outputting, by the second adder hardware module, a second adder output value at a second adder output interface; and
  receiving, by a third adder hardware module, the second left-shift output value at a fifth adder input interface;
  receiving, by the third adder hardware module, the second adder output value at a sixth adder input interface; and
  outputting, by the third adder hardware module, a third adder output value at a third adder output interface;
  wherein the first adder hardware module is configured to output the first adder output value equal to the binary input value received at the second adder input interface if a first enable input received at the first adder hardware module, based on a first preceding adder output value from an immediately-preceding cycle, is a pass value, and wherein the first adder hardware module is configured to output the first adder output value equal to a sum of the values received at the first and second adder inputs if the first enable input received at the first adder hardware module is an add value,
  wherein the second adder hardware module is configured to output the second adder output value equal to the first adder output value received at the fourth adder input interface if a second enable input received at the second adder hardware module, based on a second preceding adder output value from an immediately-preceding cycle, is a pass value, and wherein the second adder hardware module is configured to output the second adder output value equal to a sum of the values received at the third and fourth adder inputs if the enable input received at the second adder hardware module is an add value, and
  wherein the third adder hardware module is configured to output the third adder output value equal to the second adder output value received at the sixth adder input interface if a third enable input received at the third adder hardware module, based on a third preceding adder output value from an immediately-preceding cycle, is a pass value, and wherein the third adder hardware module is configured to output the third adder output value equal to a sum of the values received at the fifth and sixth adder inputs if the enable input received at the third adder hardware module is an add value.

17. The computer-implemented method of claim 16, wherein the third adder output value is a pipelined multiply-scan result value.

18. The computer-implemented method of claim 16, wherein the first adder output value is initialized with a value of one.

19. The computer-implemented method of claim 16, wherein the first enable input is equal to a binary value of a least significant bit of the first preceding adder output value, the second enable input is equal to a binary value of a bit number one of the second preceding adder output value, and the third enable input is equal to a binary value of a bit number two of the third preceding adder output value.

20. The computer-implemented method of claim 16, further comprising:
  clocking the first left-shift hardware module, the second left-shift hardware module, the first adder hardware module, the second adder hardware module, and the third adder hardware module by a common clock hardware module.

* * * * *